United States Patent
Liu et al.

(10) Patent No.: US 10,482,054 B1
(45) Date of Patent: Nov. 19, 2019

(54) AXI-CAPI ADAPTER

(71) Applicant: Xilinx, Inc., San Jose, CA (US)

(72) Inventors: Ling Liu, Saggart (IE); Michaela Blott, Malahide (IE); Kimon Karras, Athens (GR); Thomas Janson, Walldorf (DE); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 401 days.

(21) Appl. No.: 15/261,626

(22) Filed: Sep. 9, 2016

(51) Int. Cl.
  *G06F 13/42* (2006.01)
  *G06F 13/40* (2006.01)
  *G06F 13/38* (2006.01)
  *H04L 12/861* (2013.01)

(52) U.S. Cl.
  CPC .......... *G06F 13/42* (2013.01); *G06F 13/4068* (2013.01); *G06F 13/385* (2013.01); *G06F 13/4027* (2013.01); *H04L 49/9063* (2013.01)

(58) Field of Classification Search
  CPC .......... G06F 12/0815; G06F 2212/621; G06F 13/42; G06F 13/4068; G06F 13/385; G06F 13/4027; H04L 49/9063
  See application file for complete search history.

(56) References Cited

U.S. PATENT DOCUMENTS

| | | | |
|---|---|---|---|
| 8,359,557 B1 | 1/2013 | Chen et al. | |
| 8,443,129 B1 | 5/2013 | Murray et al. | |
| 8,447,957 B1 | 5/2013 | Carrillo et al. | |
| 8,479,042 B1 | 7/2013 | James-Roxby et al. | |
| 8,667,192 B2 | 3/2014 | Allaire et al. | |
| 8,838,869 B1 | 9/2014 | Puranik | |
| 9,130,559 B1 | 9/2015 | Ahmad et al. | |
| 9,135,213 B2 | 9/2015 | Taylor et al. | |
| 9,147,024 B1 | 9/2015 | Kathail et al. | |
| 2017/0132163 A1* | 5/2017 | Aslot | G06F 3/0619 |

OTHER PUBLICATIONS

Xilinx, Inc., AMBA AXI4 to IBM CAPI Adapter, Application Note: Virtex-7 FPGAs, XAPP1293; v1.0, Aug. 8, 2016, pp. 1-21, San Jose, CA USA.
Xilinx, Inc., AXI Reference Guide, UG761, v13.3, Oct. 19, 2011,106 pp., San Jose, CA USA.

* cited by examiner

*Primary Examiner* — Ernest Unelus
(74) *Attorney, Agent, or Firm* — Patterson + Sheridan, LLP

(57) ABSTRACT

The coherent accelerator processor interface (CAPI) provides a high-performance when using heterogeneous compute architectures, but CAPI is not compatible with the advanced extensible interface (AXI) which is used by many accelerators. The examples herein describe an AXI-CAPI adapter (e.g., a hardware architecture) that converts AXI signals to CAPI signals and vice versus. In one example, the AXI-CAPI adapter includes four modules: a low-level shim, a high-level shim, an AXI full module, and an AXI Lite module which are organized in a hierarchy of hardware elements. Each of the modules outputs can output a different version of the AXI signals using the hierarchical structure.

20 Claims, 6 Drawing Sheets

AXI-CAPI ADAPTER

TECHNICAL FIELD

Examples of the present disclosure generally relate to communication between an accelerator and a processor using the coherent accelerator processor interface (CAPI) protocol and, in particular, to an adapter that converts the CAPI signals to advanced extensive interface (AXI) signals.

BACKGROUND

To meet increasing system performance and energy requirements, many modern computing platforms use heterogeneous compute architectures (or heterogeneous computing) that use more than one type of processor or core. For example, a heterogeneous compute architecture may include a central processing unit (CPU) coupled to a one or more hardware accelerators such as a graphics processing unit (GPU), a cryptography co-processor, a network processor, an A/V encoder/decoder, and the like.

CAPI provides a high-performance solution to integrating different processors by permitting an accelerator to operate as an application extension to remove the overhead and complexity of the I/O subsystem. Put differently, using CAPI, the CPU can communicate with the accelerator in a coherent manner and share the same address space. In one example, the CPU and accelerator can transfer a pointer to a shared address space which avoids performing virtual to physical memory address translations.

SUMMARY

Techniques for providing an AXI-CAPI adapter are described. The AXI-CAPI adapter includes a first signal interface configured to transfer CAPI signals between the adapter and a power service layer (PSL) and a second signal interface configured to transfer AXI signals between the adapter and an AXI-compatible accelerator. The AXI-CAPI adapter includes hierarchy of hardware elements configured to convert the CAPI signals to at least two different types of AXI signals.

One example described herein is a field-programmable gate array (FPGA) that includes an AXI-compatible accelerator and a PSL configured to transmit and receive CAPI signals. The FPGA also includes an AXI-CAPI adapter coupled between the AXI-compatible accelerator and the PSL where the AXI-CAPI adapter is configured to convert the CAPI signals received from the PSL to AXI signals and transmit the AXI signals to the AXI-compatible accelerator.

One example described herein is a method that includes receiving CAPI signals from a PSL at a first signal interface of an AXI-CAPI adapter and converting the CAPI signals to at least two different types of AXI signals using a hierarchy of hardware elements in the AXI-CAPI adapter. The method includes transmitting the at least two different types of AXI signals on a second signal interface of the AXI-CAPI adapter, where the second signal interface is coupled to an AXI-compatible accelerator.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
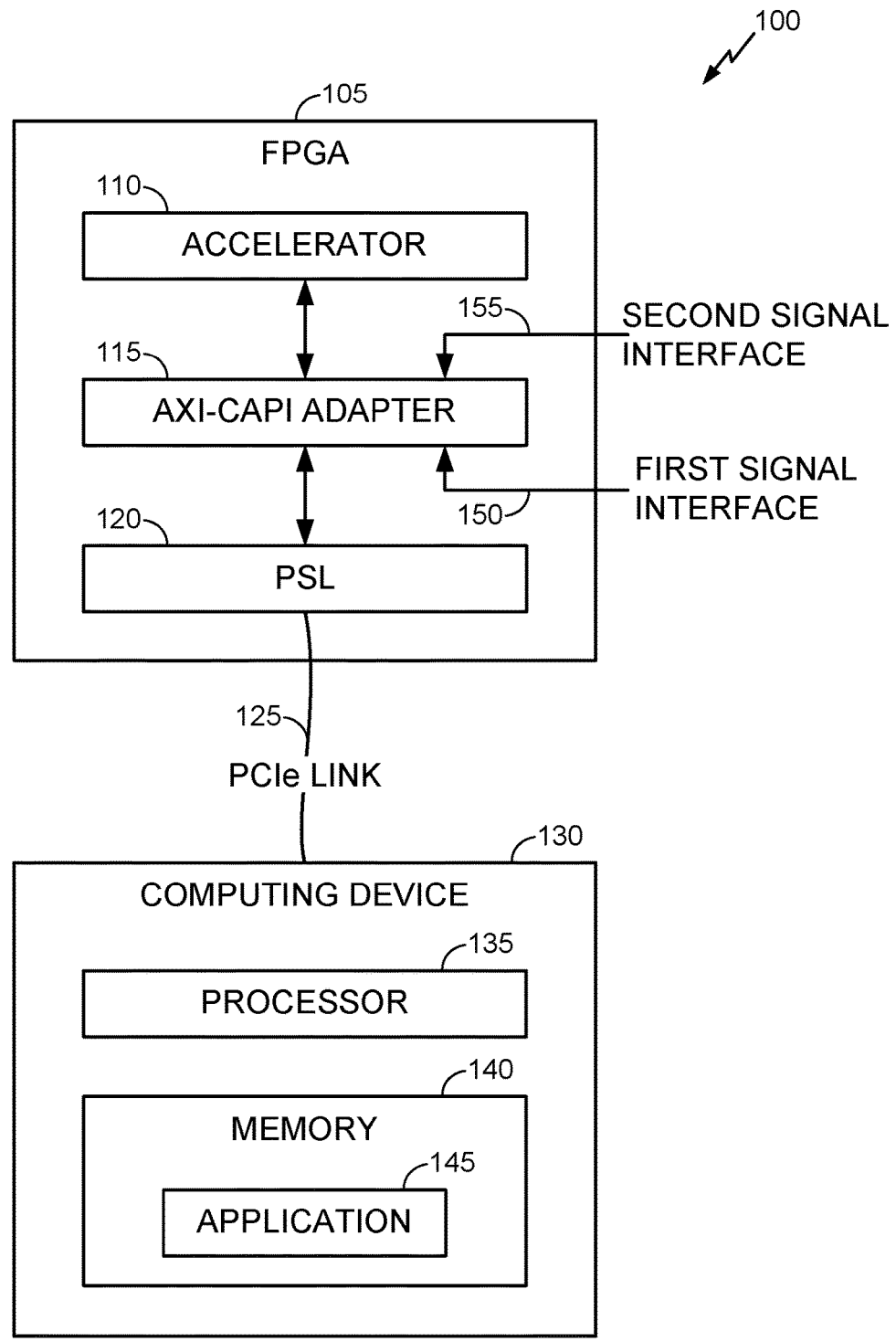
FIG. 1 is a schematic diagram of an AXI-CAPI adapter for an accelerator according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

While CAPI provides high-performance when using heterogeneous compute architectures, CAPI is not compatible with the advanced extensible interface (AXI) used by many accelerators. The examples herein describe an AXI-CAPI adapter (e.g., a hardware architecture) that converts AXI signals to CAPI signals and vice versus. In one example, the AXI-CAPI adapter includes four modules: a low-level shim, a high-level shim, an AXI full module, and an AXI Lite module which are organized in a hierarchy of hardware elements. The modules can output a different version of the AXI signals using the hierarchical structure. For example, CAPI signals that pass through the low level shim and the AXI Lite module are converted to AXI Lite signals, CAPI signals that pass through both the low-level shim and the high-level shim are converted to AXI Stream signals, and CAPI signals that pass through the low-level shim, high-level shim, and the AXI Full module are converted into AXI Full signals.

FIG. 1 is a schematic diagram of a computing system 100 with an AXI-CAPI adapter 115 for an accelerator 110. The computing system 100 includes a field-programmable gate array (FPGA) 105 and a computing device 130 coupled together via a PCIe link 125. The FPGA 105 includes the accelerator 110, the AXI-CAPI adapter 115, and a power service layer (PSL) 120. The accelerator 110 can include a GPU, cryptography co-processor, network processor, AN encoder/decoder, and the like. Although one accelerator 110 is shown, the FPGA 105 can include any number of accelerators of any type.

In one example, the accelerator 110 uses AXI to transfer AXI control and data signals between a first signal interface 150 on the AXI-CAPI adapter 115. Because the AXI signals are not compatible with the CAPI protocol, the AXI-CAPI adapter converts the AXI signals into corresponding CAPI signals which are then forwarded to the PSL 120 using a second signal interface 155. In one example, the adapter 115 and PSL 120 include hardware elements, firmware elements, or combinations thereof.

The PSL 120 uses the PCIe link 125 to transfer CAPI control and data signals to a processor 135 in the computing device 130. In one example, the CAPI protocol executes on top of the PCIe protocol to transmit the CAPI signals between the PSL 120 and the computing device 130 (or more specifically, the processor 135). One advantage of using CAPI is that the accelerator 110 and the processor 135 can share the same memory address—i.e., memory 140. Thus, instead of having to transfer data to the accelerator 110 to perform a specific function or task, the processor 135 can use CAPI (which includes the PSL 120) to transfer a pointer to the data in the shared memory 140. The accelerator 110 can then independently use the PSL 120 to read from or write to the memory 140.

The memory 140 stores an application 145 that may request the processor 135 to perform a special function, such as render vector data for display. Instead of performing the task, the processor 135 forwards the task to the accelerator 110 using CAPI. The processor 135 can provide a pointer to the accelerator 110 using the PSL 120 to the vector data that is to be processed by a GPU in the accelerator 110 to render the graphics for display. Doing so avoids the need of a software driver that performs virtual to physical memory translations when transferring the vector data from the memory 140 to the accelerator 110.

Moreover, by providing the AXI-CAPI adapter 115 between the PSL 120 and the accelerator 110, the AXI-complaint accelerator 110 can take advantage of the heterogeneous computing environment enabled by CAPI without the designer of the accelerator 110 having to understand CAPI and its accelerator interface. That is, the AXI-CAPI adapter 115 abstracts the CAPI protocol such that from the perspective of the accelerator 110, it appears to be communicating with an AXI-compatible device.

Figure 2:
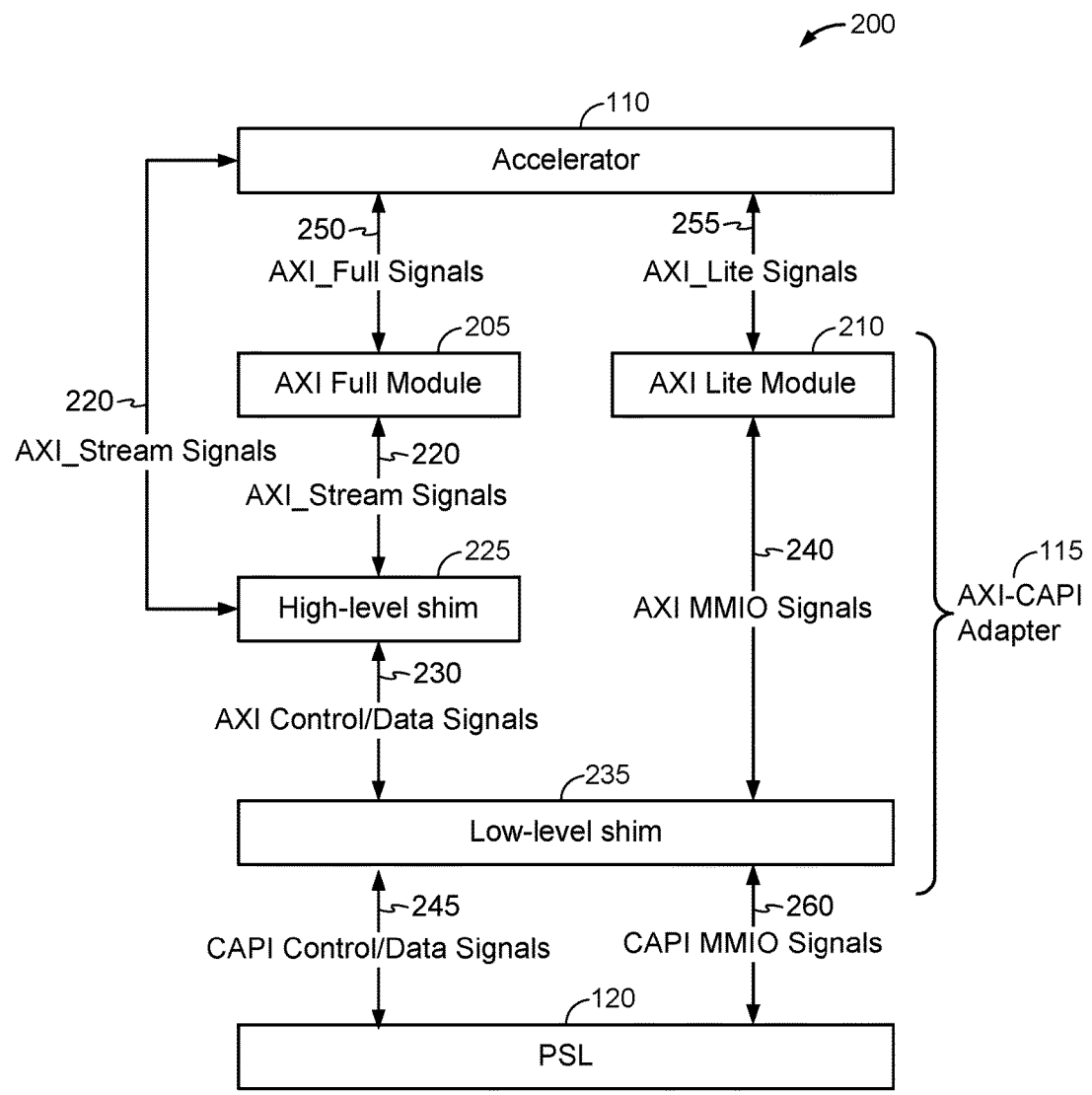
FIG. 2 is a schematic diagram of the AXI-CAPI adapter according to an example.

FIG. 2 is a schematic diagram of the AXI-CAPI adapter 115 according to an example. In system 200, the AXI-CAPI adapter 115 includes a low-level shim 235, a high-level shim 225, an AXI Full module 205, and an AXI Lite module 210 coupled between the accelerator 110 and the PSL 120. As shown, CAPI control/data signals 245 and CAPI memory mapped input/output (MMIO) signals 260 are transferred between the low-level shim 235 and the PSL 120. As described in detail below, the low-level shim 235 converts the CAPI control/data signals 245 and CAPI MMIO signals 260 into AXI control/data signals 230 and AXI MMIO signals 240, and vice versa.

The AXI Lite module 210 converts the AXI MMIO signals 240 received from the low-level shim 235 into AXI Lite signals 255 which are then transmitted to the accelerator 110. The process also works in reverse where the accelerator 110 transmits AXI Lite signals 255 to the AXI Lite module 210 which converts those signals 255 into AXI MMIO signals 240 which are received at the low-level shim 235. In turn, the low-level shim 235 converts the AXI MMIO signals 240 into CAPI MMIO signals 260. The PSL 120 can then forward the CAPI MMIO signals 260 to a processor using the PCIe link (not shown).

The high-level shim 225 converts the AXI control/data signals 230 into AXI Stream signals 220 which are then forwarded to either the AXI Full module 205 or to the accelerator 110 (or both). The AXI Full module 205 converts the AXI Stream signals 220 into AXI Full signals 250 which are then provided to the accelerator 110. Thus, the hierarchical structure of the modules in the AXI-CAPI adapter 115 can covert the CAPI signals provided by the PSL 120 into three different types of AXI signals—i.e., AXI Lite signals 255, AXI Stream signals 220, and AXI Full signals 250—which can be separately provided to the accelerator 110.

In one example, the accelerator 110 may only transmit or receive using one or two of the three types of AXI signals. For example, the accelerator 110 may use only AXI Lite signals 255 but not use the AXI Full signals 250 and AXI Stream signals 220. One advantage of the AXI-CAPI adapter 115 is that it is compatible with any AXI accelerator 110 regardless if the accelerator 110 uses all or a portion of the different AXI signals. Nonetheless, in one example, the AXI-CAPI adapter 115 may be altered to output only one or two of the different types of AXI signals. For example, if the accelerator 110 needs only AXI Stream and AXI Lite signals, the AXI-CAPI adapter 115 may not include the AXI Full module 205. In another example, if the accelerator 110 needs only the AXI Full signals, the adapter 115 may not include the AXI Lite module 210.

Figure 3:
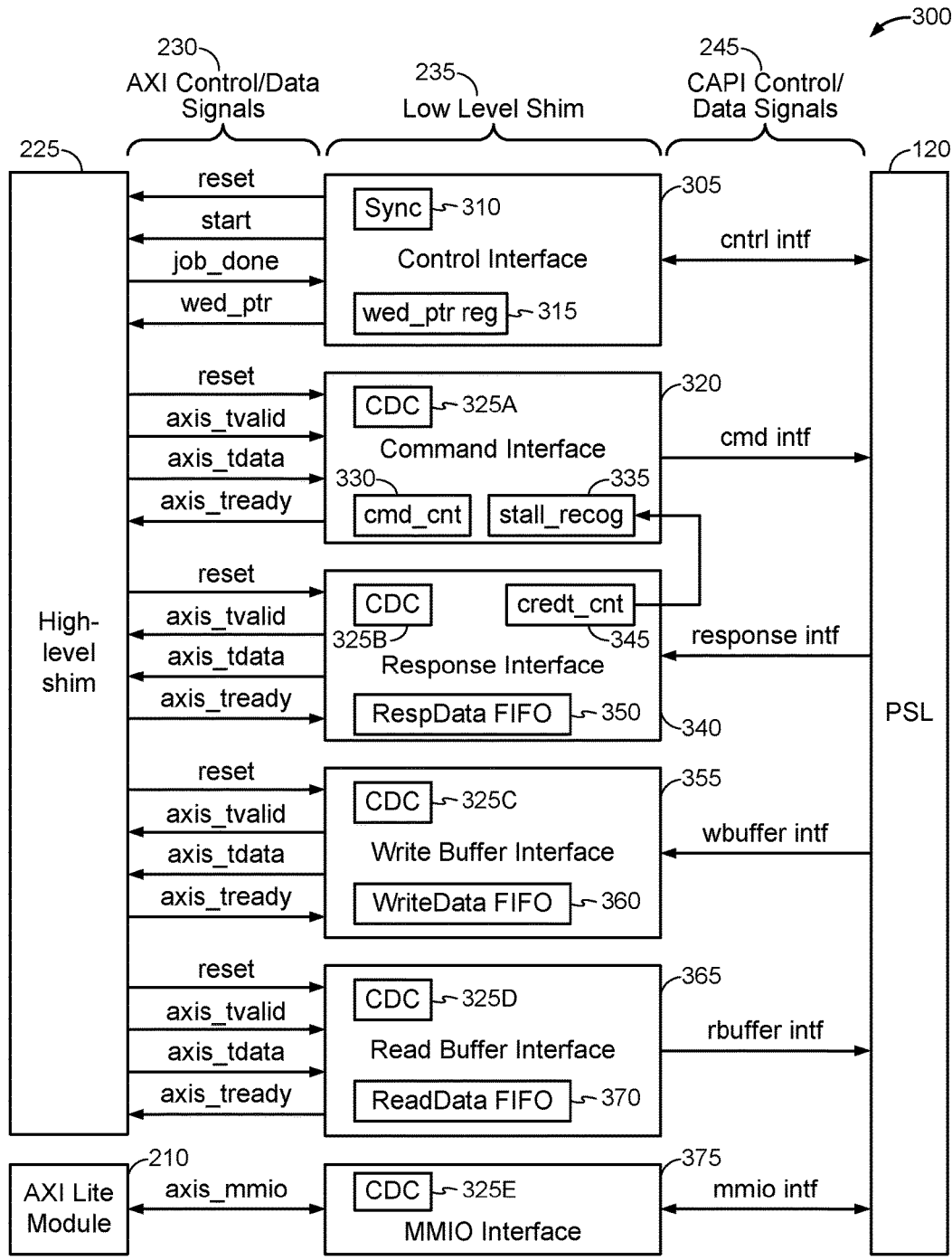
FIG. 3 is a schematic diagram of a low-level shim in the AXI-CAPI adapter according to an example.

FIG. 3 is a schematic diagram of the low-level shim 235 in the AXI-CAPI adapter according to an example. As shown, the low-level shim 235 is between the PSL 120 and the high-level shim 225 in the hierarchical structure of the adapter. The PSL 120 outputs the CAPI control/data signals 245 which includes five sub-interfaces of CAPI: a control interface (cntrl intf), command interface (cmd intf), response interface (response intf), read/write buffer interface (wbuffer and rbuffer intf) and the MMIO interface (MMIO intf). The low-level shim 235 has a corresponding interface module for each of the sub-interfaces of the CAPI protocol.

A control interface 305 receives and transmits the cntrl intf signals. The control interface 305 receives pointer to shared memory and instructions from the PSL 120 to perform a particular task (e.g., process vector data, decrypt data, encode data, etc.). The control interfaces 305 includes a work element descriptor (WED) pointer register 315 (wed_ptr reg) that stores the pointer to shared memory (e.g., memory 140 in FIG. 1) that includes the data for the task. Using the pointer stored in the register 315, the accelerator can retrieve the data without the system having to perform virtual to physical memory translations.

Using the cntrl intf signals, the control interface 305 generates a global reset signal that can reset the logic in the accelerator or reset all the logic in the FPGA (assuming the accelerator is disposed on the FPGA). The control interface 305 also generates a start signal and a web_ptr signal indicating to the accelerator when it can start the task and the pointer (or pointers) corresponding to the task. The job-done signal is transmitted from the high-level shim 225 to the control interface 305 in response to the accelerator finishing the task. The control interface 305 informs the PSL 120 that the job is done using the cntrl intf signals.

The control interface 305 also includes a sync 310 which converts the timings of the cntrl intf signals to the timings of the AXI control/data signals 230 (i.e., the reset, start, job done, and web_ptr signals). Stated generally, the CAPI control/data signals 245 and the AXI control/DATA signals 230 may be part of two different clock domains that operate at different frequencies. The sync 310 and the clock domain converters (CDC) 325 in the other interfaces permit the low-level shim 235 to output signals in the respective clock domains.

A command interface 320 transmits cmd intf signals to the PSL 120 using a reset signal, axis_tvalid signal, and axis_tdata signal received from the high-level shim 225. Generally, the cmd intf signals are commands from the accelerator to read data from, or write data, to the shared memory. These may include commands to access cache memory, access the shared memory, or to pre-fetch commands. If the command is valid (as indicated by the axis_tvalid signal), the PSL 120 processes the data. The axis_tdata signal includes a pointer to the location of the data in memory the accelerator wants to read or write and may also include a tag for the issued command.

However, in one example, the PSL 120 can process only a certain number of commands from the accelerator simultaneously (e.g., 64). To handle the backpressure that may occur if the PSL 120 is busy, the command interface 320 includes a command count register 330 (cmd_cnt) which indicates the current number of commands assigned to the PSL 120. If the PSL 120 is currently processing the maximum number of commands, the command interface 320 uses the axis_tready signal to inform the high-level shim 225 that the PSL 120 cannot process any additional commands.

As the PSL 120 completes commands, a stall recognition module 335 receives updates from a response interface 340. In one example, the low-level shim 235 uses a credit based command system where issuing commands to the PSL costs a credit. As the PSL 120 completes the commands, a credit is returned to the command interface 320 which decrements the current value of the command count register 330 and informs the high-level shim 225 via the axis_tready signal that the PSL 120 can handle another command.

The response interface 340 receives a response intf signal from the PSL 120 when the PSL 120 finishes a command issued using the command interface 320. The response intf signal may include the tag of the commands performed, whether the command was performed successfully, and the number of credits returned (e.g., a command may require more than one credit). The response interface 340 updates a credit counter 345 (credit_cnt) indicating the current number of credits available to the low-level shim 235. If the credit counter 345 hits zero, the response interface 340 informs the command interface 320 which prevents the command interface 320 from transmitting additional commands to the PSL 120 as described above.

The response interface 340 includes a response data FIFO 350 for handling backpressure at the high-level shim 225. Like the PSL 120, the high-level shim may be able to process a limited number of response from the PSL 120. If the axis_tready signal received by the response interface 340 indicates the high-level shim 225 cannot process any additional responses, the response interface 340 stores the response from the PSL 120 in the FIFO 350. Once the high-level shim 225 is ready, the response interface 340 transmits the tag of the command to the high-level shim 225 using the axis_tvalid and axis_tdata signals so the high-level shim 225 (and the accelerator) can determine if the command was performed successfully.

A write buffer interface 355 (which is a write buffer from the perspective of the application on the computing device but a read buffer from the perspective of the accelerator) receives a wbuffer intf signal from the PSL 120 which includes requested data from memory. That is, the wbuffer intf returns data corresponding to a read data command issued by the command interface 320 which is forwarded to the high-level shim 225 using the axis_tdata signal. However, if the axis_tready signal indicates that the high-level shim 225 is too busy to receive the write data, the write buffer interfaces stores the data in a write data FIFO 360 until the high-level shim 225 is ready.

A read buffer interface 365 (which is a read buffer from the perspective of the application on the computing device but a write buffer from the perspective of the accelerator) receives read buffer data to be stored in memory using the axis_tvalid and axis_tdata signals. The read buffer interface 365 transmits this read data, which corresponds to a write request transmitted by the command interface 320, to the PSL 120 via rbuffer intf signals. However, if the read buffer interface 365 is too busy, the read data can be stored in a read data FIFO 370.

A MMIO interface 375 receives the mmio intf signals from the PSL 120 and forwards these signals to the AXI Lite module 210 substantially unchanged via the axis_mmio signals. Like the other interfaces, the MMIO interface 375 includes a CDC 325E that receives the mmio intf signals in the CAPI clock domain and issues the axis_mmio signals in the AXI clock domain.

Figure 4:
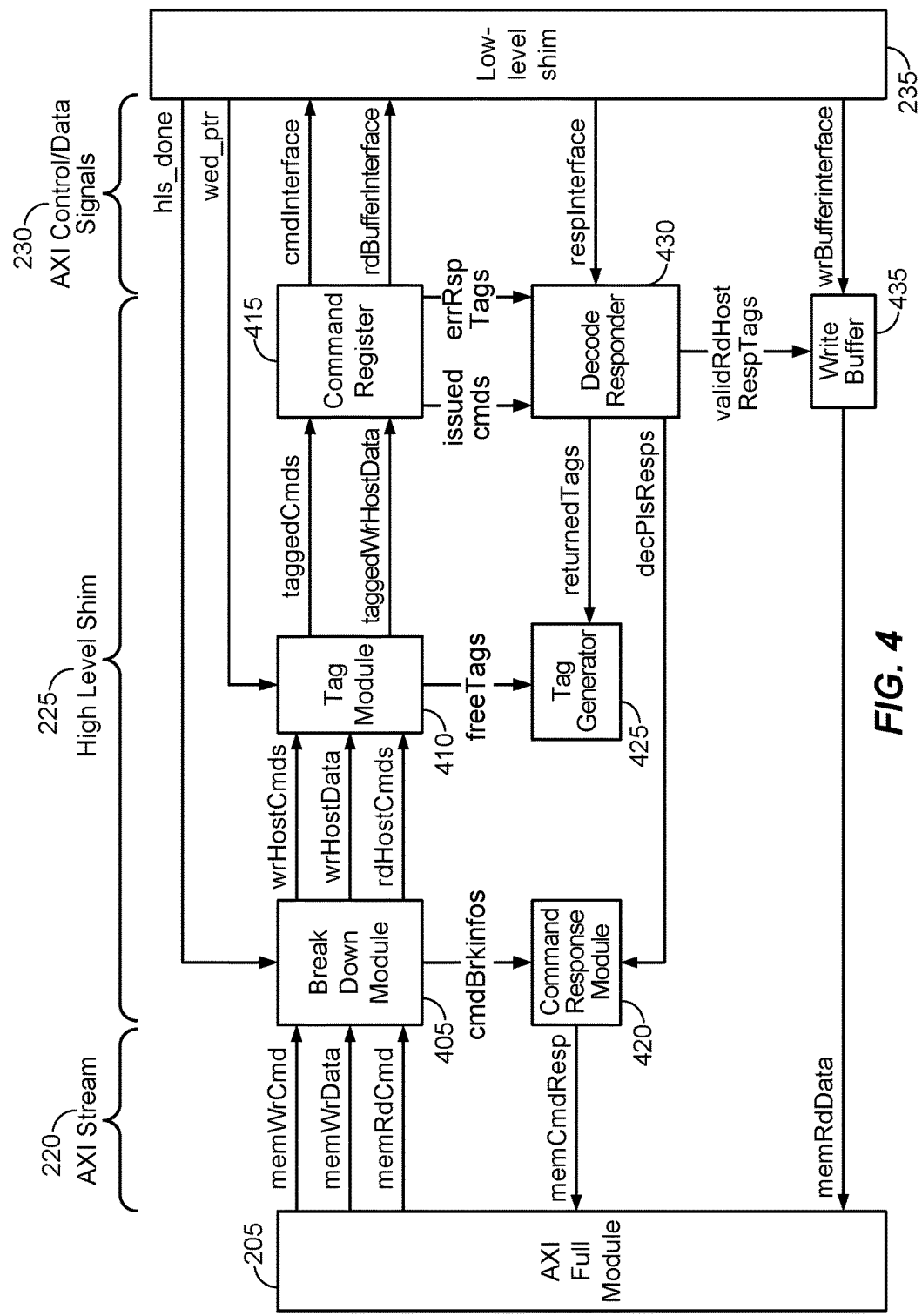
FIG. 4 is a schematic diagram of a high-level shim in the AXI-CAPI adapter according to an example.

FIG. 4 is a schematic diagram of the high-level shim 225 in the AXI-CAPI adapter according to an example. As shown, the high-level shim 225 exchanges AXI control/data signals 230 with the low-level shim 235 and exchanges AXI Stream signals 220 with the AXI Full module 205. For conciseness, the various AXI control/data signals 230 shown in FIG. 3 outputted or received by the command interface 320, the response interface 340, the write buffer interface 355, and the read buffer interface 365 are condensed in FIG. 4 to the cmdInterface, respinterface, wrBufferinterface, and rdBufferinterface signals, respectively.

The AXI Full module 205 transmits memory write command signals (memWrCmd), memory write data signals (memWrData), and memory read command signals (memRdCmd) to a break down module 405 which divides big chunks of data transfer request into cache-line-sized read or write commands. That is, the read and write commands in the AXI stream signals 220 are formatted with a start address of the memory read/write and the number of bytes corresponding to the command. However, to be compatible with CAPI, these read/write commands are converted into cache-line-sized read/writes by the break down module 405. To do so, the break down module 405 determines the number of different cache line read/writes are needed to satisfy the received AXI stream read/write defined by the memWrCmd and memRdCmd signals. For example, an AXI Stream read command to retrieve 2000 bytes can be subdivided into sixteen CAPI read commands (assuming the cache line size of the processor in the computing device is 128 bytes).

The break down module 405 transmits the broken down commands and data to a tag module 410 using the wrHostCmds, wrHostData, and rdHostCmds signals. The tag module 410 provides a tag to each of the broken down commands which uniquely identifies the command. In this example, the high-level shim 225 includes a tag generator 425 which maintains the tags that can be used by the tag module 410. If the PSL can only process 64 commands, upon boot up, the tag generator 425 generates 64 unique tags that the tag module 410 can assign to received commands. The tag generator 425 informs the tag module 410 of the free tags via the freeTags signal. In this example, the tag module 410 can also tag the data corresponding to a write command. Additionally, the tag module 410 receives the wed_ptr signal from the low-level shim 235 which indicates the portion of the shared memory assigned to a particular task.

Once tagged, the tag module 410 uses the taggedCmds and taggedWrHostData signals to transmit the tagged commands (and tagged data if it is a write command) to a command register 415 which forwards the commands and the write data to the command interface in the low-level shim 235 via the cmdInterface and rdBufferinterface signals.

As described above, the respinterface signals from the response interface in the low-level shim 235 indicate if the PSL successfully completed a command. A decode responder 430 receives the respinterface signals and decodes the data carried over those signals to determine when the tags can be recycled or reused to issue more commands. To do so, the command register 415 sends a issuedCmds signal so the decode responder 430 knows the tags of the commands that have been issued to the PSL. If a command was successfully completed, the decode responder 430 informs the tag generator 425 via the returnedTags signal which in turn informs the tag module 410 that another tag is free. However, if the command was not successfully, the decode responder 430 informs the command register 415 via the errRepTags signals that the command should be reissued.

The decode responder 430 also informs a command response module 420 when a command was successfully performed via a decPLSResp signal. The command response module 420 counts how many PSL commands have been performed and compares this number to the number of commands issued by the break down module 405. If those numbers are equal, the command response module 420 can indicate that all the PSL commands for an AXI Stream command have been completed. For example, if an AXI stream command was broken down into sixteen separate PSL commands, once the count maintained by the command response module 420 is sixteen, the module 420 can inform the AXI Full module 205 that the AXI Stream command was completed via the memCmdResp signal.

The high-level shim 225 also includes a write buffer 435 which receives the requested data from the low-level shim 235 via the wrBufferinterface and transmits this data to the AXI Full module 205 using memRdData signals. In this example, the write buffer 435 uses the validRdHostRespTags from the decode responder 430 to compare valid tags to the read data received from the low-level shim 235. The write buffer 435 validates the data if the data received from the PSL has the same tag as received from the decode responder 430.

In addition to subdividing the AXI Stream commands, the break down module 405 also generates the high-level shim done signal (hls_done) in response to receiving a predetermined signal indicating the assigned job or task is done. That is, if the accelerator has completed the task (and there are no more AXI Stream read or writes to be performed), the hls_done signal is activated to inform the PSL that the job is complete.

Figure 5:
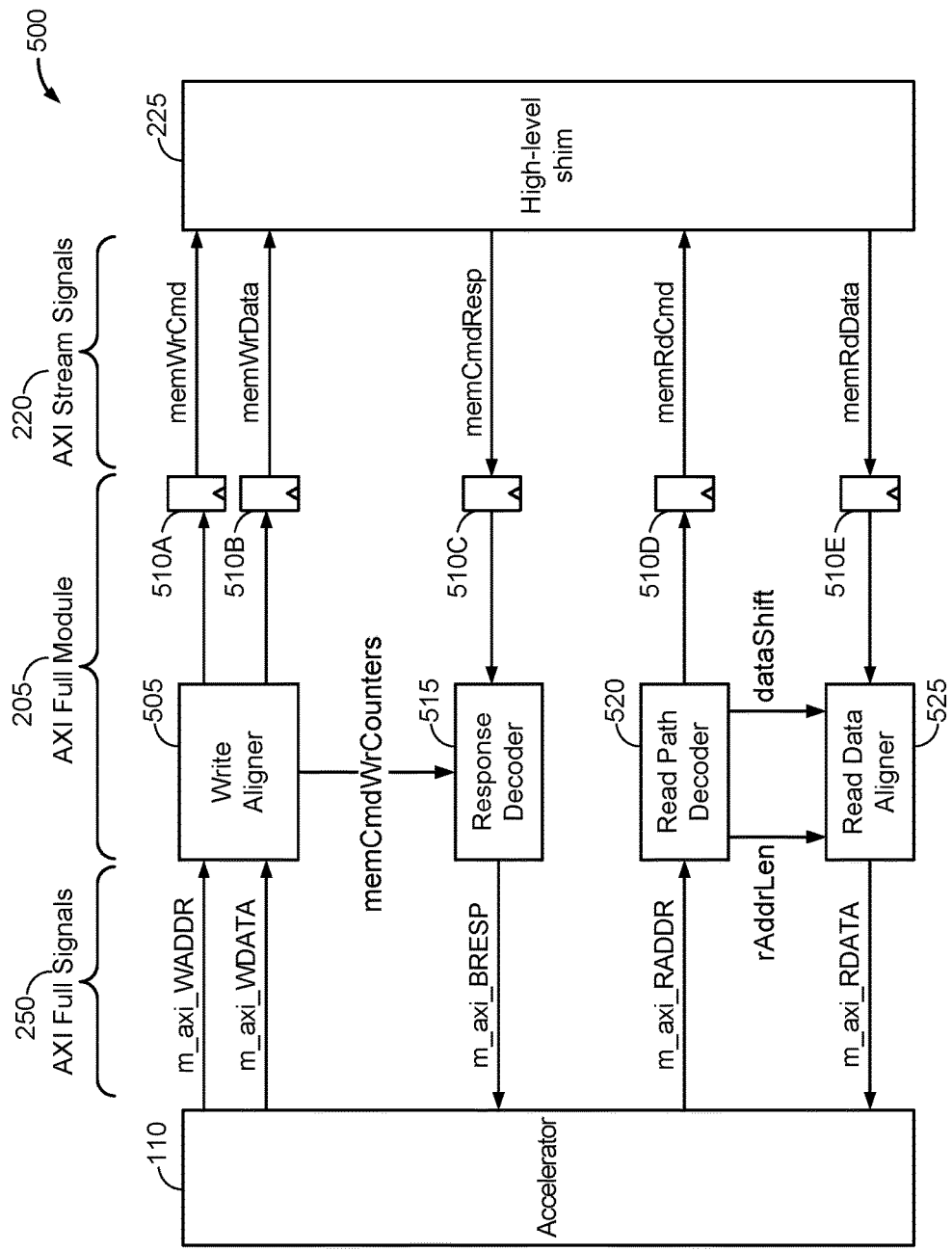
FIG. 5 is a schematic diagram of an AXI Full module in the AXI-CAPI adapter according to an example.

FIG. 5 is a schematic diagram of the AXI Full module 205 in the AXI-CAPI adapter according to an example. As shown, the AXI Full module 205 is disposed between the high-level shim 225 described in FIG. 4 and the accelerator 110. Moreover, the same AXI Stream signals 220 as described in FIG. 4 are transferred between the AXI Full module 205 and the high-level shim 225. As described below, the AXI Full module 205 converts the AXI Stream signals 220 into AXI Full signals 250 which are then transmitted to the accelerator 110. Of course, the process also works in reverse where the AXI Full module 205 converts the AXI Full signals 250 into AXI Stream signals 220.

Generally, the AXI Full signals 250 include read and write commands transmitted using the m_axi_WADDR and m_axi_RADDR signals that are agnostic regarding the cache line size of the host computing system (e.g., the processor and/or memory) coupled to the accelerator 110. For example, the m_axi_WADDR and m_axi_RADDR signals may indicate that the relevant data for a read or write command starts in the middle of a cache line. To compensate, the AXI Full module 205 includes a write aligner 505 which converts the m_axi_WADDR signal and the m_axi_WDATA signals (which indicates the number of bytes in a burst that should be written into host memory via CAPI) into the memWrCmd and memWrData signals which are aligned according to the cache line size of the processor. For example, the write aligner 505 may zero pad the data so that the start address is at the beginning of a cache line. The write aligner 505 outputs a memCmdWrCounters signal indicating the amount the aligner 505 had to shift the m_axi_WADDR signals and m_axi_WDATA signals to align these signals to the architecture of the host computing device. In one example, the write aligner 505 converts one AXI Full command into multiple cache line aligned AXI Stream commands.

A response decoder 515 in the AXI Full module 205 receives the memCmdResp signal from the high-level shim 225 which indicates that one or more AXI Stream commands were completed. The response decoder 515 uses the alignment information obtained from the write aligner 505 to convert the AXI Stream signal into a m_axi_BRESP signal which informs the accelerator 110 that the AXI Full command was completed successfully. That is, the alignment information enables the response decoder 515 to properly format the m_axi_BRESP signal so that the accelerator 110 can identify which command was completed.

The AXI Full module 205 includes a read path decoder 520 which receives the m_axi_RADDR signal from the accelerator 110. Like the m_axi_WADDR signal, the m_axi_RADDR signals is not cache line aligned and can include a start address for a read command that is in the middle of a cache line. The read path decoder 520 cache aligns the read command and outputs the memRdCmd signal to the high-level shim 225. The read path decoder 520 also outputs rAddrLen and dataShift signals to a read data aligner 525 for shifting the read data provided by the high-level shim 225 (which is cache aligned) to the AXI Full format. In one example, the read data aligner 525 identifies the appropriate byte that corresponds to the start of the read command in the read data received from the high-level shim 225 and then shifts the read data so it starts at the correct data byte.

Figure 6:
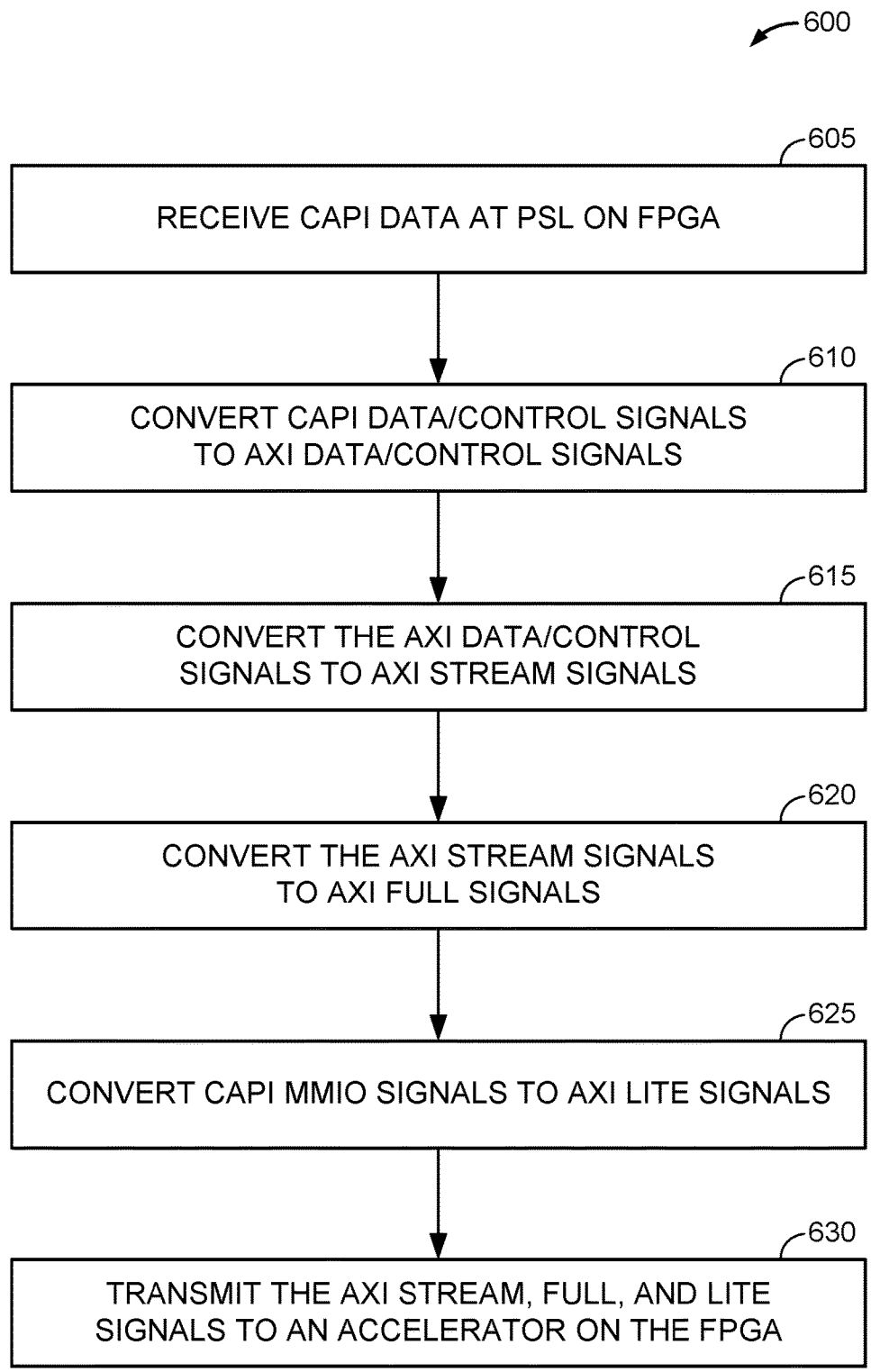
FIG. 6 is a flowchart for operating an AXI-CAPI adapter according to an example.

FIG. 6 is a flowchart of a method 600 for operating an AXI-CAPI adapter according to an example. At block 605, a low-level shim in the AXI-CAPI adapter receives CAPI data from a PSL on a FPGA. In one example, the FPGA includes an accelerator used in conjunction with a processor that is not located on the FPGA to form a heterogeneous computing system At block 610, the low-level shim converts the CAPI data/control signals to AXI data/control signals. In one example, the low-level shim is between the PSL and the high-level shim in the hierarchical structure of the AXI-CAPI adapter. The CAPI data/control signals include five sub-interfaces of CAPI: a control interface (cntrl intf), command interface (cmd intf), response interface (response intf), read/write buffer interface (wbuffer and rbuffer intf)

and the MMIO interface (MMIO intf). The low-level shim has a corresponding interface module for each of the sub-interfaces of the CAPI protocol to convert the CAPI data/control signals in AXI data/control signals.

At block 615, the high-level shim converts the AXI data/control signals generated by the low-level shim into AXI Stream signals. In one example, the AXI Stream signals are directly forwarded from the high-level shim to the accelerator. In this manner, an accelerator that uses the AXI Stream protocol can use only the high-level shim and low-level shim in the AXI-CAPI interface in order to transmit and receive data with an external processor using the CAPI protocol.

However, if the accelerator uses AXI Full (or a combination of AXI Full and AXI Stream), at block 620 the AXI Full module in the AXI-CAPI adapter coverts the AXI Stream signals received from the high-level shim to AXI Full signals. Thus, if desired, the accelerator can use the portion of the adapter hierarchy that includes the AXI Full module, the high-level shim, and the low-level shim to transmit and receive AXI Full signals.

At block 625, the AXI Lite module converts the CAPI MMIO signals to AXI Lite signals. In one example, CAPI MMIO signals are received at the low-level shim which converts these signals to AXI MMIO signals. The AXI Lite module receives the AXI MMIO signals from the low-level shim and generates corresponding AXI Lite signals. Thus, an accelerator that uses AXI Lite may need to use only the portion of the adapter hierarchy that includes the AXI Lite module and the low-level shim to communicate with the external processor.

At block 630, the AXI-CAPI adapter transmits the AXI Stream, AXI Full, and AXI lite signals to an accelerator on the FPGA. Although the AXI-CAPI adapter can transmit all the AXI-type signals, in other examples, the adapter may transmit only one or two of these types of signals to the accelerator. For example, an accelerator may use AXI Stream data but not AXI Full or AXI Lite to communicate with the external processor.

While the foregoing is directed to specific examples, other and further examples may be devised without departing from the basic scope thereof, and the scope thereof is determined by the claims that follow.

What is claimed is:

1. An Advanced eXtensible Interface (AXI) to coherent accelerator processor interface (CAPI) adapter, comprising:
    a first signal interface configured to transfer CAPI signals between the adapter and a power service layer (PSL);
    a second signal interface configured to transfer AXI signals between the adapter and an AXI-compatible accelerator; and
    a hierarchy of hardware elements configured to convert the CAPI signals to at least two different types of AXI signals.

2. The adapter of claim 1, wherein the at least two different types of AXI signals comprises at least two of: AXI Full signals, AXI Lite signals, and AXI Stream signals, and wherein the PSL is directly coupled to the first signal interface and the AXI-compatible accelerator is directly coupled to the second signal interface.

3. The adapter of claim 1, wherein the hierarchy of hardware elements comprises a low-level shim coupled to the first signal interface and a high-level shim coupled to the low-level shim, wherein the high-level shim is configured to output AXI Stream signals based on the CAPI signals received by the low-level shim.

4. The adapter of claim 3, wherein the hierarchy of hardware elements comprises an AXI Full module configured to output AXI Full signals based on receiving the AXI Stream signals from the high-level shim.

5. The adapter of claim 3, wherein the hierarchy of hardware elements comprises an AXI Lite module coupled to the low-level shim, wherein the AXI Lite module is configured to output AXI Lite signals based on the CAPI signals received by the low-level shim.

6. The adapter of claim 3, wherein the low-level shim comprises clock domain converter circuitry configured to convert the CAPI signals in a first clock domain to the AXI signals in a second clock domain.

7. The adapter of claim 1, wherein the CAPI signals define (i) a task issued from a processor to the AXI-compatible accelerator and (ii) a pointer to a memory shared by the AXI-compatible accelerator and the processor containing data corresponding to the task.

8. A field-programmable gate array (FPGA), comprising:
    an Advanced eXtensible Interface (AXI)-compatible accelerator;
    a power service layer (PSL) configured to transmit and receive coherent accelerator processor interface (CAPI) signals; and
    an AXI-CAPI adapter coupled between the AXI-compatible accelerator and the PSL, wherein the AXI-CAPI adapter is configured to convert the CAPI signals received from the PSL to at least two different types of AXI signals and transmit the at least two different types of AXI signals to the AXI-compatible accelerator.

9. The FPGA of claim 8, wherein the AXI-CAPI adapter comprises a hierarchy of hardware elements configured to convert the CAPI signals to the at least two different types of AXI signals.

10. The FPGA of claim 9, wherein the at least two different types of AXI signals comprises at least two of: AXI Full signals, AXI Lite signals, and AXI Stream signals.

11. The FPGA of claim 9, wherein the hierarchy of hardware elements comprises a low-level shim coupled to the PSL and a high-level shim coupled to the low-level shim, wherein the high-level shim is configured to output AXI Stream signals based on the CAPI signals received by the low-level shim.

12. The FPGA of claim 11, wherein the hierarchy of hardware elements comprises an AXI Full module configured to output AXI Full signals based on receiving the AXI Stream signals from the high-level shim.

13. The FPGA of claim 11, wherein the hierarchy of hardware elements comprises an AXI Lite module coupled to the low-level shim, wherein the AXI Lite module is configured to output AXI Lite signals based on the CAPI signals received by the low-level shim.

14. The FPGA of claim 11, wherein the low-level shim comprises clock domain converter circuitry configured to convert the CAPI signals in a first clock domain to the AXI signals in a second clock domain.

15. The FPGA of claim 8, wherein the CAPI signals define (i) a task issued from a processor external to the FPGA to the AXI-compatible accelerator and (ii) a pointer to a memory shared by the AXI-compatible accelerator and the processor containing data corresponding to the task.

16. A method, comprising:
    receiving coherent accelerator processor interface (CAPI) signals from a power service layer (PSL) at a first signal interface of an Advanced eXtensible Interface (AXI)-CAPI adapter;

converting the CAPI signals to at least two different types of AXI signals using a hierarchy of hardware elements in the AXI-CAPI adapter; and transmitting the at least two different types of AXI signals on a second signal interface of the AXI-CAPI adapter, wherein the second signal interface is coupled to an AXI-compatible accelerator.

17. The method of claim 16, wherein the at least two different types of AXI signals comprises at least two of: AXI Full signals, AXI Lite signals, and AXI Stream signals.

18. The method of claim 16, wherein converting the CAPI signals to at least two different types of AXI signals comprises:

receiving the CAPI signals at a low-level shim in the AXI-CAPI adapter coupled to a high-level shim in the AXI-CAPI adapter; and outputting AXI Stream signals from the high-level shim based on the CAPI signals received by the low-level shim.

19. The method of claim 18, wherein converting the CAPI signals to at least two different types of AXI signals comprises:

receiving the AXI Stream signals at an AXI Full module in the AXI-CAPI adapter; and outputting AXI Full signals from the AXI Full module based on the AXI Stream signals outputted by the high-level shim.

20. The method of claim 18, wherein converting the CAPI signals to at least two different types of AXI signals:

outputting AXI memory mapped input/output (MMIO) signals from the low-level shim to an AXI Lite module in the AXI-CAPI adapter; and converting the AXI MMIO signals into AXI Lite signals using the AXI Lite module.

* * * * *